June 17, 1952     E. S. BOE     2,600,464
APPARATUS FOR SEPARATION OF SULFUR VAPOR
Filed March 12, 1947
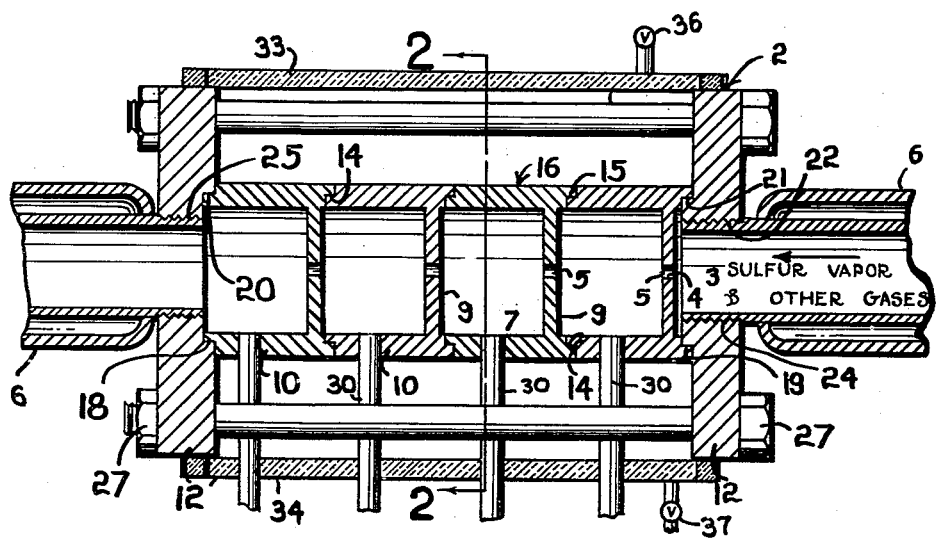
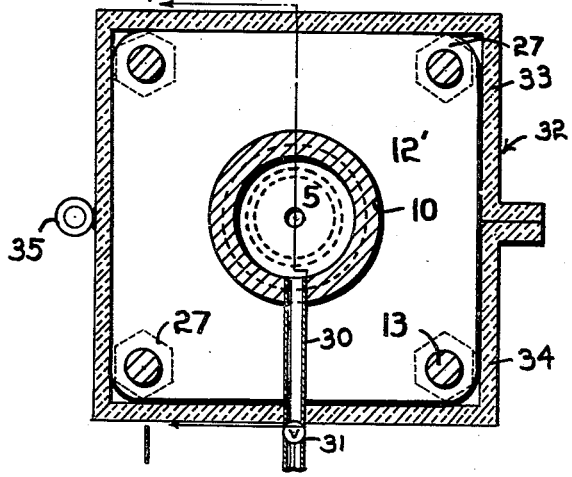
EDDIE S. BOE
*INVENTOR.*
BY *Lester B. Clark*
*Ray L. Smith*
ATTORNEYS Patented June 17, 1952

2,600,464

UNITED STATES PATENT OFFICE 2,600,464

APPARATUS FOR SEPARATION OF SULFUR VAPOR

Eddie S. Boe, Newgulf, Tex.

Application March 12, 1947, Serial No. 734,256

6 Claims. (Cl. 183—1)

The invention relates to a method and apparatus for condensing of vapors from gases, and more particularly to a device for condensation of sulphur vapors from gases.

An object of the invention is to provide a device which may readily be inserted in a flow line for condensing sulphur vapors from gases passing therethrough.

Another object of the invention is to provide a device for condensing sulphur vapors from gases, which device includes a plurality of built-in constriction members.

Another object of the invention is to provide a device for condensing sulphur vapors from gases, which device includes a plurality of built-in constriction members of substantially the same size and configuration whereby such members may be interchanged one for the other.

Another object of the invention is to provide a device for insertion in a flow line comprising a plurality of replaceable built-in constriction member sections to condense sulphur vapors from the gases passing through the flow line.

A further object of the invention is to provide a container comprising removable flanged tubular sections with orifice plates connected thereto and positioned in a flow line by a pair of end plates.

A further object of the invention is to provide a container comprising removable flanged tubular sections with orifice plates connected thereto and positioned in a flow line by a pair of end plates whereby condensation of the sulphur vapors passing through the container is effected by restricting the flow of gases therethrough.

A still further object of the invention is to provide a method and apparatus for the recovery of sulphur from gases by the sudden constriction of a gas stream, thereby creating turbulent velocity changes to effect condensation of the sulphur from the gases and/or the segregation of sulphur in the liquid or solid phase therefrom.

Other and further objects of the invention will be readily apparent when the following description is considered in connection with the accompanying drawings, wherein:

Fig. 1 is a sectional view of the preferred embodiment of the device; and

Fig. 2 is a sectional view of Fig. 1 taken on the line 2—2 thereof.

The device is shown generally at 2 in Fig. 1 fitted in position in a steam jacketed flow line 6 through which the sulphur vapors and other gases are passing. When the gas stream enters the device 2, the area through which the same volume of gas must pass is reduced in cross-section from that at 3 to the comparative smaller area at 4. A sudden constriction of the gas is effected by passing through the orifice 5 in the constriction members 9 which causes a turbulent velocity change in the stream of gas. A sudden constriction of the gas stream and the subsequent turbulent velocity changes and the alternate changes between velocity and static heads effect condensation of the sulphur in vapor, liquid, or solid phase entrained in the gas passing through the container 16.

Generally the device 2 comprises a plurality of sections 10 fitting together to form a complete unitary container 16. The end plates 12 and 12' are provided with suitable means such as the bolts 13 passing therethrough lengthwise of the container to retain sections 10 in position. It is to be noted that each section 10 is provided with a constriction member 9 having an opening 5 therethrough. An annular shoulder section at 14 is arranged on the end of each section to engage the next adjacent section which is in turn provided with a similar co-fitting annular flange 15. One of the outermost sections 10, which forms the end of the container 16, is likewise formed similar to the intermediate sections 10 and one such end section is provided with an annular shoulder 18 and the opposite outermost container end section is provided with a flange 19 to fit the conforming portions 20 and 21 of the end plates 12 and 12' respectively. The end plates are provided with suitable means such as the threads 22 on the inner periphery of the openings 24 and 25 to provide a means for readily inserting the device into a flow line.

Each section 10 is preferably made exactly alike so that the units may be interchanged one with the other or they may be replaced by a new section when the old ones become worn. Such construction entails a minimum of machine work to provide replacement parts, and by removing a section 10 from its position in the container, a constriction orifice member is thereby eliminated from the path of the gas.

Each of the sections 10 may be provided with a tap 30 secured thereto by any suitable means and which extends downwardly from each section 10 and is provided with a valve 31 whereby any liquid sulphur trapped in the chambers 7 may be drained off.

When it is desired to remove the trapped sulphur in liquid form, it seems obvious that it will be necessary to retain the separator unit at roughly the same temperature as the flow line 6.

To this end the unit may be provided with an insulated box 32 as seen in Fig. 2, which is adapted to fit snugly about the separation unit. The box is shown as being composed of an upper part 33 connected to a lower portion 34 by suitable means such as a hinge 35.

Suitable means may be used to supply heat to the interior of the box such as steam which may be injected into the box through a steam connection in through the valve 36. A drain 37 is provided to permit draining of condensed steam vapors from the box. It is to be noted that the box is easily removable from the unit so that the separation unit may or may not be used in conjunction with the insulated steam box depending upon the conditions desired by the operator of the unit.

While the size and number of consecutive openings 5 are dependent upon various conditions such as, the entering ratio of sulphur to total gas volume, the amount of sulphur the operator desires to remove from the gas, and the velocity of the gas in the flow line 6, it has been found that an opening with a diameter of ⅛" will remove a maximum amount of sulphur from the gas when the gas velocity on the upstream is .38' per second, and using four sections 10 in series to comprise the container 16 through which the gases will pass. While the sections 10 have been shown in Fig. 2 as being of cylindrical configuration, it seems obvious that they might be of any other suitable shape. It is to be noted that no baffles are provided in the structure to lengthen the path of the flow of gas therethrough, and simultaneously to remove the sulphur from the gas by impingement, but rather the turbulence of the gas due to the sudden constriction as it passes through the consecutive openings 5, and the sudden static and velocity head change is relied upon to condense the sulphur from the gases.

While the foregoing is believed to adequately define the operation of the device embodying the invention, by way of summary it is assumed that 6 is a flow line through which gases are flowing which contain sulphur vapors or in which the sulphur is entrained in liquid or solid phase. A suitable number of sections 10 are fitted together to form a container 16 which is long enough to span the intervening distance in the flow line where the device is to be positioned. The end plates 12 and 12' are positioned on the flow line with the sections 10 positioned therebetween. The bolts 13 mounted through the end plates 12 and 12' are secured in position by means such as nuts 27. As the gas flows into the device from the flow line 6, it is first restricted as it passes through the opening 5. The gas is then expanded from the opening 5 to the adjacent chamber 7 formed between the constriction means 9. The gas then flows through the next orifice 5 in the adjacent constriction member and is then expanded into the next chamber and so on through the device. The sudden velocity and static head changes, as the gas flows through the device, effect positive separation of sulphur vapors or any liquid or solid sulphur entrained in the gas passing through the flow line 6.

If it is desired to remove the separation unit from the flow line 6, it is only necessary to unfasten the bolts 13 from the nuts 27 which serve to clamp the sections 10 positioned therebetween together to form the unitary container 16. These sections 10 may then be disengaged from each other and the end plates 12 and 12' removed from the flow line. The two ends of the flow line may then be connected by a pipe or coupling of a suitable length to span the intervening distance.

It seems obvious that as the gases continue to pass through the separation unit, sulphur will collect in the chambers 7. As these chambers fill up, it will be necessary when not using steam box 32, to replace them with clean sections or to remove them momentarily from the flow line to clean the sulphur out and then replace them in position again. If the separation unit is used in conjunction with a steam box 32, then the sulphur may be removed in liquid form by draining it from the chambers 7 through the taps 30. The valves 31 are provided outside of the steam box 32 so that the unit may be drained without removal of the steam box 32 from about the separation unit.

The construction described hereinabove has been found to be completely satisfactory, and it has been found that such a construction removes the maximum amount of sulphur from a given volume of gas in a minimum amount of time. The interchangeability and replaceability of the various parts of the container make it simple in construction and easy to adapt to various situations in which it is desired to remove sulphur from gases.

Broadly the invention contemplates a method and apparatus for the condensation of sulphur vapors and/or segregation of liquid and solid sulphur which may be entrained in gases by passing such gases through a predetermined series of orifices in a sectioned unitary container.

The invention claimed is:

1. A device for condensing sulphur vapors from gases comprising, a plurality of cooperating flanged tubular sections connected together to form a container for passage of gases therethrough, end plates in said container removably connected together to retain said sections in position, an inlet conduit connected through one of said end plates, an outlet conduit connected through the other of said end plates, and a plurality of spaced vertically arranged constriction members in said container, there being an opening through each of said members which is of relative small area compared to the area of said member.

2. A device for condensing sulphur vapors from gases comprising, a plurality of cooperating flanged tubular sections connected together to form a container for passage of gases therethrough, end plates in said container removably connected together to retain said sections in position, an inlet conduit connected through one of said end plates, an outlet conduit connected through the other of said end plates, and a plurality of spaced vertically arranged constriction members in said container, there being an opening through each of said members which is of relative small area compared to the area of said member, said openings being substantially in axial alignment through said container.

3. A device for condensing sulphur vapors from gases in a flow line comprising, a container, an inlet for said flow line to said container, a plurality of spaced vertically arranged constriction members therein, there being an opening in each of said members which is of relative small area compared to the surface area of said member, a pair of end plates to slidably engage said container, and means for securing said plates to inlet and outlet conduits and to said container.

4. In a device for condensing sulphur vapors from gases, a container with a plurality of spaced vertically arranged wall like constriction members therein, an inlet to said container there being at least one constriction opening in each of said members, the opening area being relatively small compared to the area between said members to constrict the gases as they pass through said container, an outlet provided on the container for discharging the liquid and solid phase sulfur.

5. In a device for condensing sulphur vapors from gases, a container with a plurality of spaced vertically arranged wall like constriction members therein, an inlet to said container, there being at least one constriction opening in each of said members, the opening area being relatively small compared to the area between said members to constrict the gases as they pass through said container, an outlet provided on the container for discharging the liquid and solid phase sulphur, and an insulated box about said container.

6. In a device for condensing sulphur vapors from gases, a container with a plurality of spaced vertically arranged wall like constriction members therein, an inlet to said container, there being at least one constriction opening in each of said members, the opening area being relatively small compared to the area between said members to constrict the gases as they pass through said container, an outlet provided on the container for discharging the liquid and solid phase sulphur, and an insulated box about said container and an outlet from each area between said wall like members.

EDDIE S. BOE.

REFERENCES CITED

The following references are of record in the file of this patent:

UNITED STATES PATENTS

| Number | Name | Date |
|---|---|---|
| 1,559,035 | Egloff et al. | Oct. 27, 1925 |
| 1,616,409 | Bird | Feb. 1, 1927 |
| 1,637,372 | Eschholz | Aug. 2, 1927 |
| 2,133,875 | Steenstrup | Oct. 18, 1938 |
| 2,273,779 | Dickey et al. | Feb. 17, 1942 |